(12) United States Patent
Overby et al.

(10) Patent No.: US 10,310,130 B2
(45) Date of Patent: Jun. 4, 2019

(54) CABLE DETECTION APPARATUS WITH A COMB FILTER

(71) Applicant: Metrotech Corporation, Santa Clara, CA (US)

(72) Inventors: Johan Overby, Santa Clara, CA (US); John Mark Royle, Exeter (GB)

(73) Assignee: Metrotech Corporation, Santa Clara, CA (US)

( * ) Notice: Subject to any disclaimer, the term of this patent is extended or adjusted under 35 U.S.C. 154(b) by 487 days.

(21) Appl. No.: 14/625,496

(22) Filed: Feb. 18, 2015

(65) Prior Publication Data

US 2015/0234076 A1 Aug. 20, 2015

(30) Foreign Application Priority Data

Feb. 19, 2014 (GB) .................................. 1402951.6

(51) Int. Cl.
*G01V 3/10* (2006.01)
*G01V 3/12* (2006.01)
*G01V 13/00* (2006.01)

(52) U.S. Cl.
CPC .................. *G01V 3/10* (2013.01); *G01V 3/12* (2013.01); *G01V 13/00* (2013.01)

(58) Field of Classification Search
CPC ....................................................... G01V 3/15
See application file for complete search history.

(56) References Cited

U.S. PATENT DOCUMENTS

| 2004/0189322 A1* | 9/2004 | Pearson ................. G01V 15/00 324/542 |
| 2011/0191058 A1* | 8/2011 | Nielsen ................ B65D 83/203 702/130 |
| 2013/0333946 A1* | 12/2013 | Sugiura ................... E21B 44/00 175/24 |
| 2014/0161272 A1* | 6/2014 | Marquis .............. G10L 21/0208 381/71.7 |

* cited by examiner

*Primary Examiner* — Noam Reisner
(74) *Attorney, Agent, or Firm* — Haynes and Boone, LLP

(57) ABSTRACT

An apparatus that uses harmonics of the power line frequency at which electrical power is distributed is presented. The apparatus includes a sensor antenna to detect an electromagnetic field produced by a cable. The output of the sensor is fed to a mixer together with a signal from a sine wave generator at less than the fundamental power frequency to frequency shift the signals from the sensor. The mixed output is then amplified to provide an audible output. A single comb filter receives signals from the mixer and outputs a filtered signal removing non-harmonic frequencies but preferably passing both odd and even harmonics. The output of the comb filter is then integrated at and displayed to indicate the detection of a cable based on the filtered signal.

12 Claims, 4 Drawing Sheets

CABLE DETECTION APPARATUS WITH A COMB FILTER

RELATED APPLICATIONS

The present application claims priority to Great Britain Application No. GB 14 02 951.6, filed on Feb. 19, 2014, which is herein incorporated by reference in its entirety.

BACKGROUND

1. Technical Field

This disclosure is concerned with enhancing the performance of cable detection apparatus that uses harmonics of the power line frequency at which electrical power is distributed.

2. Discussion of Related Art

Cables that are buried, or inaccessible for other reasons, often need to be accurately located, e.g. to prevent them from being damaged during excavation work. Known cable detection devices typically have two or more magnetic sensors that sense the electromagnetic field emitted by single phase and three-phase power cables. Similar detection techniques can also be used for other utilities that do not carry electrical power as these conductors often pick up stray electromagnetic fields from nearby power lines.

The field emitted by a cable has a fundamental frequency generated by the alternating current at which power is distributed, generally 50 or 60 Hz, together with odd and even harmonics. The predominant energy is contained in the fundamental frequency and its odd harmonics, namely:

50, 150, 250, 350 Hz etc. for a 50 Hz power grid
60, 180, 300, 420 Hz etc. for a 60 Hz power grid Frequencies that are not harmonically related to the fundamental frequency merely contribute background noise, which decreases the accuracy of detection, and in an ideal detection system they would be completely rejected. It is also generally considered that removing the even harmonics (e.g. 100, 200 Hz etc. in a 50 Hz power system) will further increase the signal-to-noise ratio and improve detection accuracy. In a practical detector a combination of comb filters may be used to position periodic nulls in the sensed frequency spectrum. One comb filter is arranged to have notches positioned to reject the non-harmonic frequencies and another has notches arranged to remove the even harmonics.

Users generally benefit from hearing a "real sound" output with audible power line harmonics, and for this reason the signal received from the cable is usually amplified and fed to an audio output device. This can result in major feedback problems, commonly known as "blowback", due to electromagnetic pickup of the amplified signals from the speaker or amplifier by the field sensors. This is presently overcome by feeding the filtered signal to a mixer which shifts the frequency of the signal which is sent to the audio output device. The odd harmonics then fall within the rejection nulls of the filter system and will thus be removed if any stray output signal is picked up by the sensors.

Therefore, there is a need to improve detection accuracy, increase detection speed and reduce hardware requirements.

SUMMARY

In accordance with some embodiments, a cable detection apparatus is presented. In some embodiments, the cable detection apparatus can include a sensor to detect an electromagnetic field produced by a cable; frequency shifter to frequency shift signals from the sensor; an amplifier to amplify said frequency shifted signals; a filter to receive signals from the frequency shifter and output a filtered signal, said filter having a higher transmittance at a plurality of harmonics of a first frequency than at least one non-harmonic frequency between two of said harmonics of the first frequency; and an indicator to indicate the detection of a cable based on the filtered signal.

Frequency shifting before the filter and amplification avoids the problem of blowback whilst significantly improving detection accuracy. Some embodiments of the invention also provides cable detection apparatus that includes a filter having a higher transmittance at both odd and even harmonics of said first frequency than at least one non-harmonic frequency between two adjacent harmonics of the first frequency.

Passing both odd and even harmonics has been found to stabilize the detection signal and further improve detection accuracy.

Some embodiments of the invention also provide cable detection apparatus in which there is a single such filter between the sensor and the indicator. Using a single filter significantly reduces the requirement for detection resources.

Some embodiments of the invention also provide cable detection apparatus that includes s frequency shifter comprising a mixer and a sine wave generator operating below the fundamental frequency.

These and other embodiments will be described in further detail below with respect to the following figures.

BRIEF DESCRIPTION OF THE DRAWINGS

The following description and the accompanying drawings referred to therein are included by way of non-limiting examples in order to illustrate how some embodiments may be put into practice.

The drawings may be better understood by reading the following detailed description.

DETAILED DESCRIPTION

Although the specific example to be described below relates to power line transmission frequencies of 50 Hz it will be appreciated that other transmission fundamental frequencies may be used in a similar manner.

Figure 1:
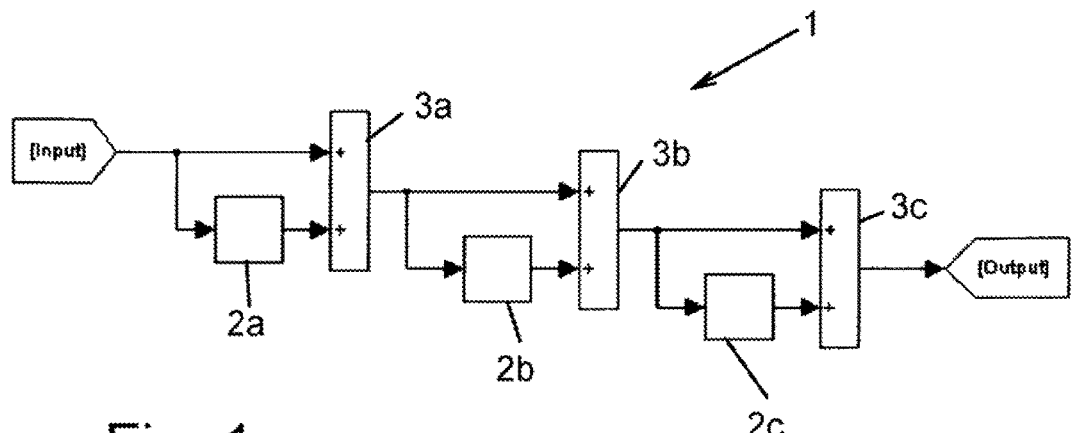
FIG. 1 illustrates a typical third order comb filter for use in cable detection apparatus in accordance with some embodiments.
Figure 2:
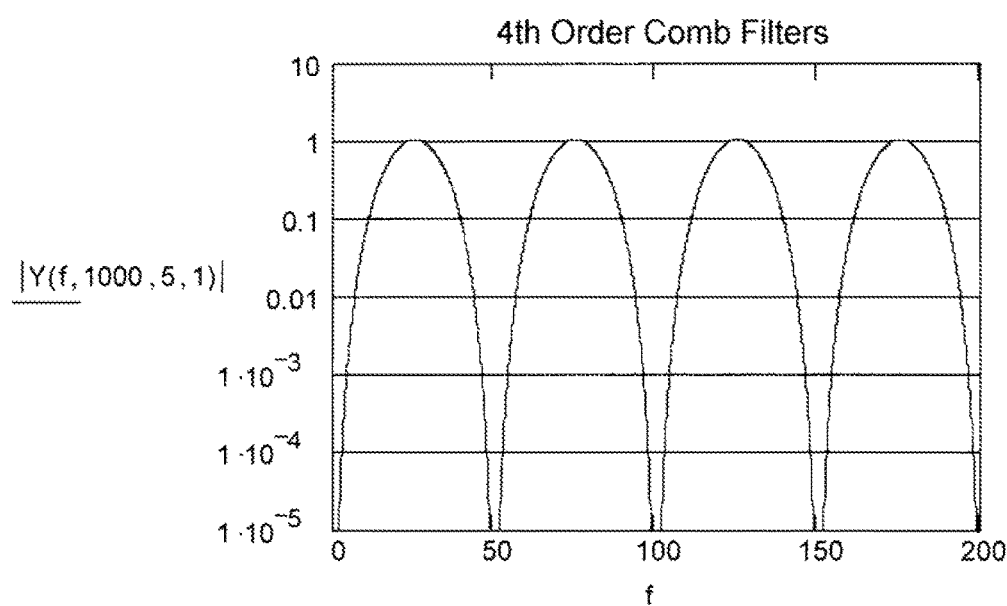
FIG. 2 shows a typical frequency response of the comb filter illustrated in FIG. 1.

Referring firstly to FIG. 1, a basic form of third order comb filter 1 for use in a cable detector according to some embodiments of the invention includes time delay units 2a, 2b and 2c and summation units 3a, 3b and 3c. An input signal containing multiple frequencies is sent directly to one input of the first summation unit 3a (a+input) while a copy of the signal passing through delay unit 2a is delayed by a time interval t and sent to another input of the summation unit (in this case another+input). The summation unit 3a outputs the sum of the two inputs and therefore exhibits peaks in signal throughput whenever the time delay is an exact multiple of the input cycle period, the peaks being separated by nulls in signal throughput. Feeding the output of the summation unit through further similar delay units and summation units as shown will narrow the attenuation bandwidth but does not change the position of the nulls. FIG. 2 shows the frequency response obtained with 4th order comb filters arranged to produce peaks in signal transmission at 25 Hz and at 50 Hz intervals thereafter, with nulls positioned between the peaks at 50 Hz intervals. As known in the art, more complex filters can be produced by using different combinations of filters, e.g. by interleaving different order filters.

Figure 3:
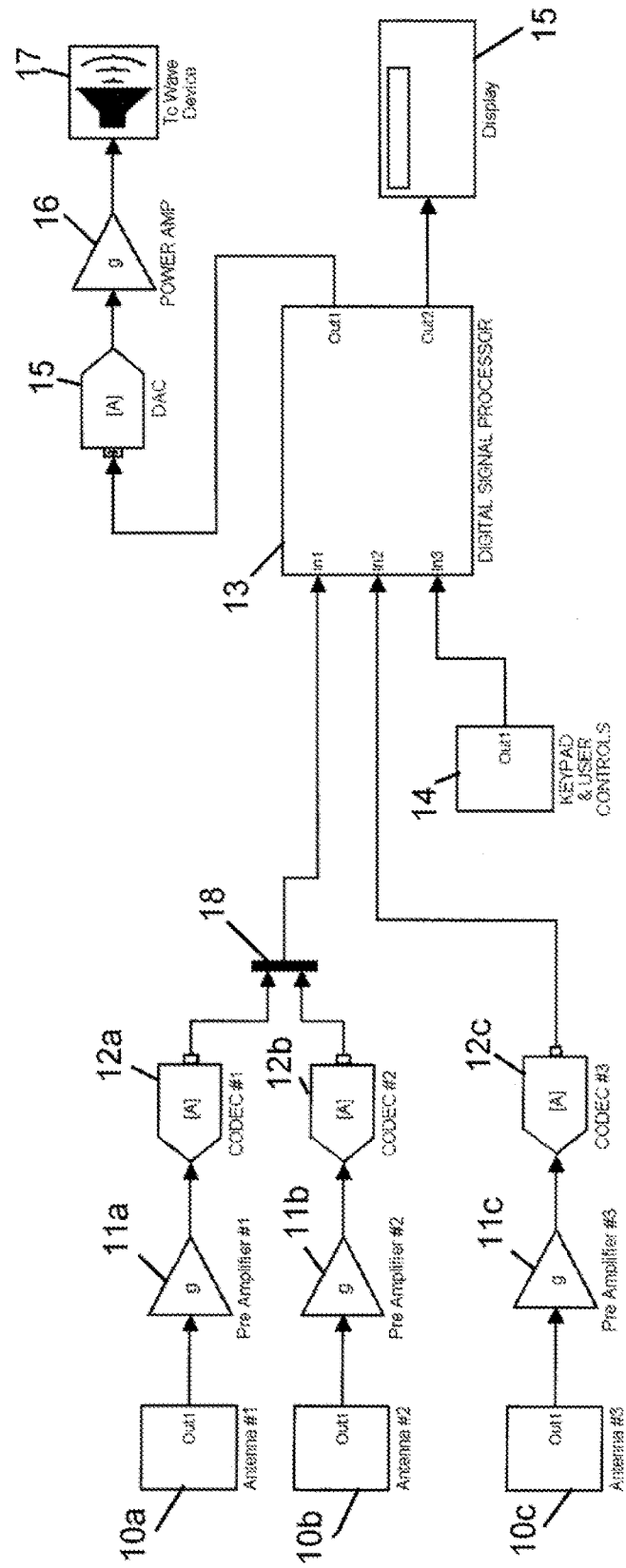
FIG. 3 illustrates a schematic diagram of cable detection apparatus incorporating the comb filter illustrated in FIG. 1.

FIG. 3 shows the basic architecture for a three-channel cable detection system in accordance with some embodiments of the invention. It should be noted however, that the number of channels in a useful cable detection system may vary from one to eight or more. It should also be appreciated that a typical system may include additional units such as a GPS receiver. In this example the cable detector has three magnetic sensors 10a, 10b and 10c in the form of ferrite antennas designed for maximum sensitivity and low noise. The output of each sensor is fed via a respective preamplifier 11a, 11b and 11c to a respective analogue-to-digital (ADC) codecs 12a, 12b and 12c. The preamplifiers have two functions:
(i) They ensure that the antenna noise picked up by the sensors (voltage and current noise) is approximately equivalent to the ADC quantisation noise. In practice this means ensuring that the antenna and preamplifier noise dominates the ADC noise by about +6 dB referred to a 1 Hz bandwidth.
(ii) The preamplifiers have a transfer function which normalizes the sensor response as a function of frequency. The combined response of the sensor and preamplifier extends from about 10 Hz to 200 kHz.

The ADC codecs 12a -12c may be, for example, 24-bit delta-sigma converters that operate at sample rates of 4 kHz<Fs<96 kHz, where Fs is the sampling frequency, nominally 50 kHz in this example. Delta-sigma ADCs have an intrinsic anti-alias filter that tracks the sampling rate and gives a strong rejection at frequencies above the Nyquist frequency Fs/2. The converter has a high dynamic range and performance, typically with a signal-to-noise-plus-distortion, S/(N+D), of +93 dB over a 50 kHz bandwidth.

The digitized outputs from the three ADC codecs are fed to a signal processing unit 13, which will be described further below. Any two or more of the channels may be combined by using one or more multiplexers 18. The processing unit also receives input from a user interface 14, which may typically include keypads, gain controls and mode selection switches, and sends output to a display 15. A further output from the processing unit 13 passes via a DAC 15 (digital-analogue converter) to an analogue power amplifier 16 which in turn drives a speaker or other suitable sound output device 17.

Figure 4:
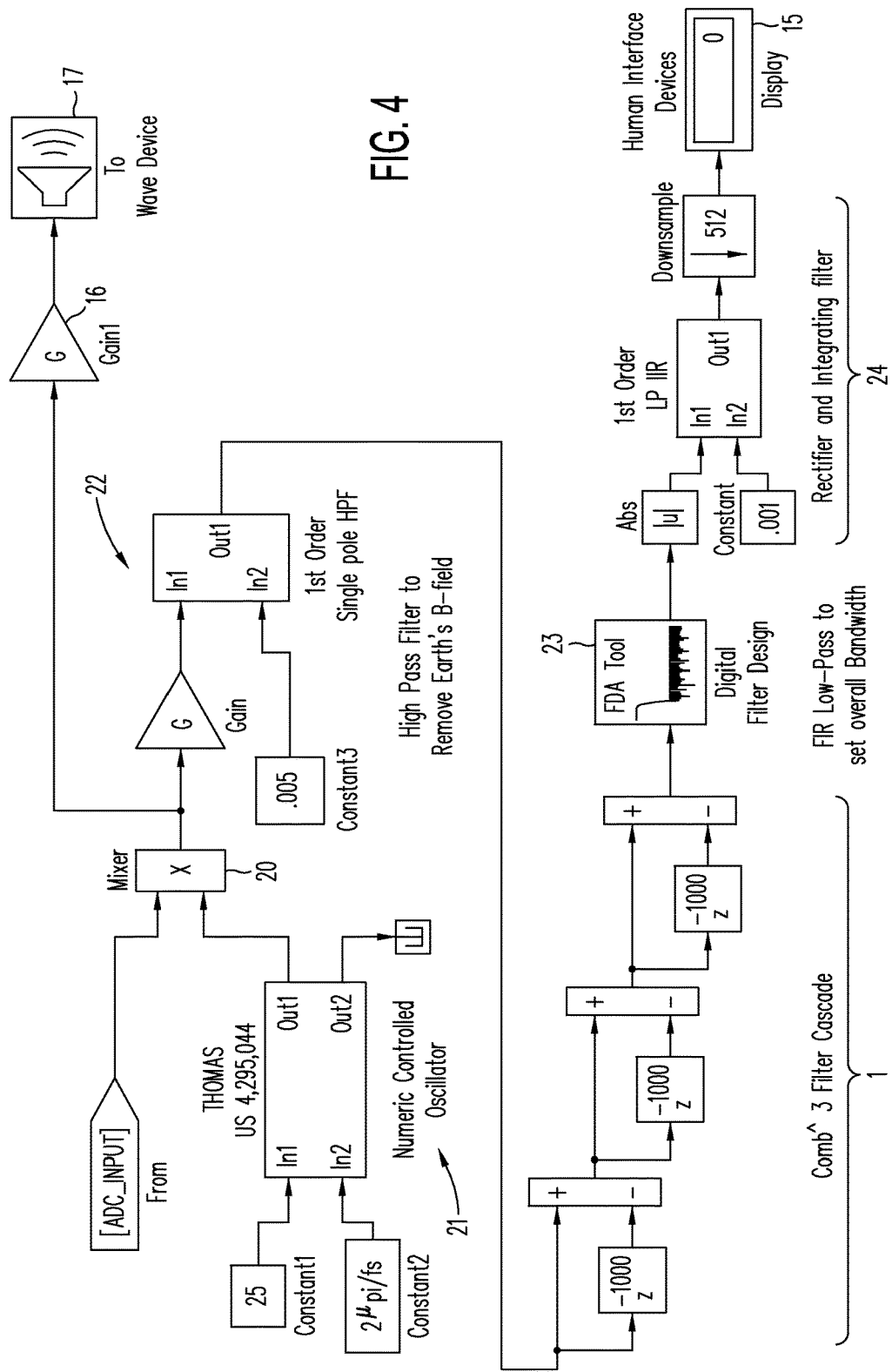
FIG. 4 illustrates a schematic diagram of the main parts of the processing unit incorporated in the cable detection apparatus shown in FIG. 3.

FIG. 4 shows one channel of the processing unit 13. The input from each of the ADC codecs 12a-12c is fed to a respective mixer 20 where the signal is multiplied with a high fidelity 25 Hz sine wave produced by a sine wave generator 21. Suitable numeric controlled oscillators for use herein are well known in the art—see U.S. Pat. No. 4,285, 044 to Thomas for example. The odd and even harmonics of the 50 Hz fundamental frequency are therefore translated by + or −25 Hz because the product of two sine waves yields two cosine waves, one at the difference frequency and one at the sum frequency. Thus, the entire sequence of power line frequencies are shifted by half the power frequency, yielding the sequence of frequencies:

25, 75, 125, 175, 225 Hz etc.

The output from the mixer 20 is then sent to the amplifier 16 and output device 17 to provide "real sound" monitoring. Since the output signals are frequency-shifted relative to the useful input frequencies blowback may be completely eliminated.

The earth's magnetic B-field, which falls at beginning of the frequency spectrum, may be minimized by the design of the magnetic sensors and the ADC response. If desired the mixer output can be fed through an optional high pass filter 22 to further reduce the influence of the earth's field. A simple second order Bessel IIR high pass filter would be sufficient for this purpose. The mixed output signal is then passed through the comb filter 1, typically a third order comb filter, which in reality may be implemented by a single difference equation providing the response shown in FIG. 2 with peaks at 25, 75, 125, 175, 225 Hz etc.

Continuing with reference to FIG. 4, the filtered signal may be fed through an optional low pass filter 23 to set the overall bandwidth of detection at roughly 4.5 kHz since the power line harmonics stop contributing useful energy at around this frequency and higher frequencies merely contribute extra noise. A standard finite impulse response (FIR) filter may be used such as a Parks-McClellan design.

The output of the low pass filter 23 (if used) is sent to a rectifier and integrating stage 24. The signal processing is not phase sensitive so the rectifier ensures that only a positive signal is integrated. The integrator may be a standard first order infinite impulse response (IIR) integrator, often referred to as a "leaky integrator". By setting the gain to 0.001 the detector will integrate several line cycles of the various power harmonics.

The final integrated output is fed to the display 15 so that the user receives a combination of the frequency shifted real audio signal and a visual representation of the magnetic signal. In many embodiments of the cable detector the final signal would be derived from a difference term relative to other magnetic sensors or sets of sensors, but the signal processing described would apply to all sensor channels. The input signal for the amplifier 16 could be taken off at any point after the mixer 20, e.g. at the output of the comb filter.

Figure 5:
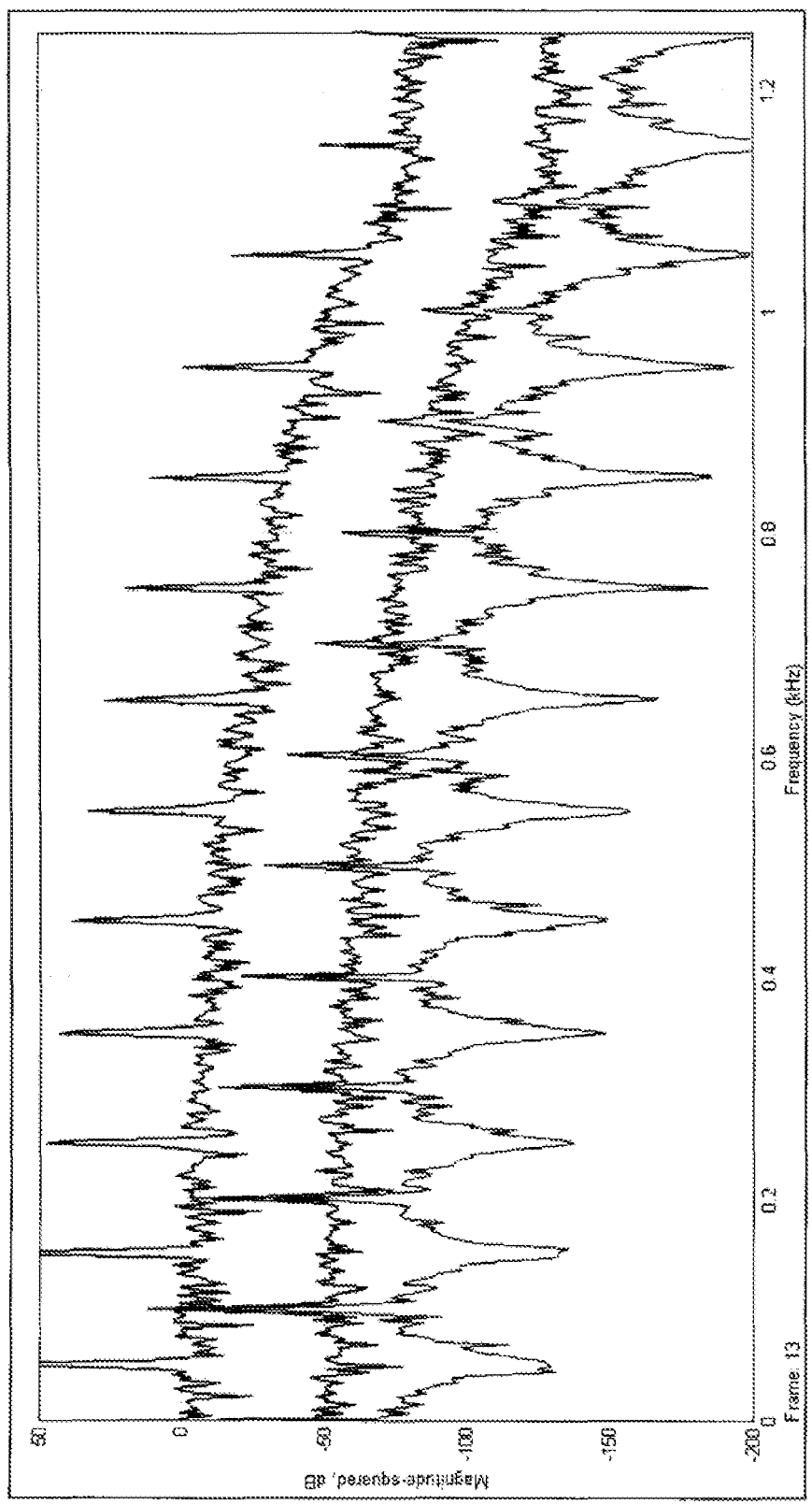
FIG. 5 shows various signals obtained from cable detection apparatus as previously illustrated.

In order to further illustrate the some embodiments of the invention, FIG. 5 shows an actual plot obtained from cable detection apparatus in accordance with the embodiments presented here. In this example the mixer was arranged to frequency-shift the antenna signals by 50 Hz and the even harmonics of the fundamental 50 Hz power line transmission frequency were rejected by the filter. The upper plot shows the input signal with strongest peaks at 50 Hz, 150 Hz, 250 Hz etc. (the odd harmonics) and the middle plot shows the mixer output after frequency-shifting by 50 Hz. The lower plot shows the output of the filter which was arranged to pass the frequency-shifted odd harmonics and reject the even harmonics. The gain of the three plots has, of course, been adjusted so that they do not overlap.

Having now described one example embodiment, the advantages of the present cable detection apparatus may be summarised as follows.

Mixing the output derived from the magnetic sensor antennas before the signal passes through the comb filter significantly improves the accuracy of the detector. No filter system is perfect and small imperfections in the filter response produce additional noise in the filter output. If these undesirable components are then mixed, the spurious noise is dispersed into a wider bandwidth which in turn gives rise to instabilities in the amplitude response of the detection system.

Contrary to conventional belief, detection accuracy is improved by including both the odd and even harmonics. Theoretically a power cable should not radiate any energy because the live and neutral lines are twisted, but in practice the balance is not perfect and the odd and even harmonics exhibit continuous transient variations due to changes in line conditions. Although the even harmonics are generally −40 dB down on the odd harmonics, and appear to be unstable when both sets of harmonics are integrated, the odd harmonics can be observed to exert a stabilizing influence on the resulting output.

Using a single difference equation filter rather than plural comb filters provides significant reductions in processing overhead and improved processing speed since there is a reduced need to handle large historical buffers of the input signal.

Embodiments of the invention are also ideally suited to block processing. The delta sigma codec, with combined ADC and DAC, samples and outputs at a rate of 4 kHz<Fs<96 kHz, typically 50 Hz. Significant processing efficiency may be obtained in real software DSP by buffering the sample blocks into typically 1000 samples rather than processing each sample via an interrupt. Some embodiments of the present invention are therefore believed to be more adaptable to a block processing implementation than more conventional systems exhibited in the prior art.

Whilst the above description places emphasis on the areas which are believed to be new and addresses specific problems which have been identified, it is intended that the features disclosed herein may be used in any combination which is capable of providing a new and useful advance in the art.

In the preceding specification, various embodiments have been described with reference to the accompanying drawings. It will, however, be evident that various modifications and changes may be made thereto, and additional embodiments may be implemented, without departing from the broader scope of the invention as set for in the claims that follow. The specification and drawings are accordingly to be regarded in an illustrative rather than restrictive sense.

What is claimed is:

1. A cable detection apparatus comprising:
   a sensor to detect an electromagnetic field produced by a cable and provide signals, the electromagnetic field expected to have a component at a first frequency;
   a frequency shifter to frequency shift the signals from the sensor by a second frequency of half the first frequency;
   an amplifier that receives the frequency shifted signals;
   a first filter to receive signals from the amplifier and output a filtered signal, the first filter having a higher transmittance at the second frequency and at the second frequency shifted by whole multiples of the first frequency than at least one frequency between two of said shifted frequencies; and
   an indicator to indicate the detection of the cable based on the filtered signal.

2. The cable detection apparatus of claim 1, wherein the whole multiples include both odd and even multiples.

3. The cable detection apparatus of claim 1, wherein there is only a single comb filter between the sensor and the indicator.

4. The cable detection apparatus of claim 1, wherein the first filter is a comb filter.

5. The cable detection apparatus of claim 1, wherein the frequency shifter includes a mixer and a sine wave generator operating at the second frequency.

6. The cable detection apparatus of claim 1, further comprising a second filter between the amplifier and the first filter, the second filter being a high-pass filter to remove a B-field of the earth from the signals received from the amplifier.

7. A method of cable detection, the method comprising:
   sensing an electromagnetic field produced by a cable to provide signals, the electromagnetic field expected to have a component at a first frequency;
   frequency shifting the signals by a second frequency of half the first frequency;
   amplifying the frequency shifted signals;
   filtering, using a first filter, the amplified signals, the first filter having a higher transmittance at the second frequency and at the second frequency shifted by whole multiples of the first frequency than at least one frequency between two of said shifted frequencies; and
   indicating detection of the cable based on the filtering.

8. The method of claim 7, wherein the whole multiples include both odd and even multiples.

9. The method of claim 7, further comprising filtering using only a single comb filter.

10. The method of claim 7, wherein the first filter is a comb filter.

11. The method of claim 7, wherein the frequency shifting includes mixing in a sine wave having the second frequency.

12. The method of claim 7, further comprising filtering, using a high-pass filter, the amplified signals to remove a B-field of the earth from the amplified signals.

* * * * *